United States Patent
Song

(10) Patent No.: US 9,049,138 B2
(45) Date of Patent: Jun. 2, 2015

(54) METHOD, DEVICE AND SYSTEM FOR IMPLEMENTING MULTICAST FORWARDING IN EXTENDED VLAN BRIDGE

(75) Inventor: Xiaoli Song, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 126 days.

(21) Appl. No.: 13/701,364

(22) PCT Filed: Mar. 18, 2011

(86) PCT No.: PCT/CN2011/071973
§ 371 (c)(1),
(2), (4) Date: Nov. 30, 2012

(87) PCT Pub. No.: WO2011/153858
PCT Pub. Date: Dec. 15, 2011

(65) Prior Publication Data
US 2013/0094506 A1    Apr. 18, 2013

(30) Foreign Application Priority Data
Jun. 8, 2010 (CN) .......................... 2010 1 0195389

(51) Int. Cl.
*H04L 12/761* (2013.01)
*H04L 12/46* (2006.01)
*H04L 12/18* (2006.01)

(52) U.S. Cl.
CPC ............ *H04L 45/16* (2013.01); *H04L 12/4641* (2013.01); *H04L 12/1886* (2013.01)

(58) Field of Classification Search
USPC ......... 370/389, 390, 401, 412, 432, 474, 466, 370/473, 392, 312
See application file for complete search history.

(56) References Cited

U.S. PATENT DOCUMENTS

| 7,301,946 | B2 | 11/2007 | Meier | |
|---|---|---|---|---|
| 2004/0252690 | A1* | 12/2004 | Pung et al. | 370/390 |
| 2005/0025160 | A1 | 2/2005 | Meier | |
| 2007/0097968 | A1* | 5/2007 | Du | 370/389 |
| 2010/0309912 | A1* | 12/2010 | Mehta et al. | 370/390 |
| 2011/0243136 | A1* | 10/2011 | Raman et al. | 370/392 |

FOREIGN PATENT DOCUMENTS

| CN | 1871811 A | 11/2006 |
|---|---|---|
| CN | 101145927 A | 3/2008 |

OTHER PUBLICATIONS

International Search Report in international application No. PCT/CN2011/071973, mailed on Jun. 30, 2011.
(Continued)

*Primary Examiner* — Edan Orgad
*Assistant Examiner* — Saumit Shah
(74) *Attorney, Agent, or Firm* — Oppedahl Patent Law Firm LLC

(57) ABSTRACT

The disclosure provides a method, a device, and a system for implementing multicast forwarding in an Extended VLAN (Virtual Local Area Network) Bridge (EVB), wherein the method includes: the EVB controlling bridge receives a multicast frame and acquires a multicast address from the multicast frame; inquires on a master port and an identifier (ID) of a subgroup corresponding to the multicast address from a first preset mapping table; forwards, when the ID of the corresponding subgroup is an Multicast Identifier (MCID), the multicast frame carrying the MCID to a corresponding Port Extender (PE) assembly via the master port; and the PE assembly distributes the multicast frame to a User Equipment (UE) according to a correspondence between the MCID carried in the multicast frame and a downlink port of the PE assembly.

15 Claims, 9 Drawing Sheets

(56) References Cited

OTHER PUBLICATIONS

English Translation of the Written Opinion of the International Search Authority in international application No. PCT/CN2011/071973, mailed on Jun. 30, 2011.
P802.1Qbh Draft 0.0 Introduction Jan. 21, 2010.
P802.1Qbh Multicast Overview May 26, 2010.
IEEE P802.1Qbh-DO.2 Draft Standard, May 2010.
P802.1Qbh Multicast overview, May 2010.
P802.1Qbh Draft 0.0 Introduction, Jan. 2010.
Supplementary European Search Report in European application No. 11791850.8, mailed on Feb. 26, 2015.

* cited by examiner

METHOD, DEVICE AND SYSTEM FOR IMPLEMENTING MULTICAST FORWARDING IN EXTENDED VLAN BRIDGE

TECHNICAL FIELD

The disclosure relates to the field of communications, and in particular to a method, a device, and a system for implementing multicast forwarding in an Extended VLAN (Virtual Local Area Network) Bridge (EVB).

BACKGROUND

As the communications technology develops continuously, more and more servers are deployed in a network, along with which the server virtualization technology develops rapidly, such that more and more bridges are required, substantially increasing the equipment cost of an operator as well as equipment management cost. To reduce equipment cost and equipment management cost in network deployment, in particular in a data centre network, a port extension technology for bridge is proposed in the industry, namely the investment and management cost for switching equipment are reduced by bridge port extension.

Bridge port extension is implemented by cascade of Port Extender (PE) assembly. FIG. 1 is a flowchart of multicast forwarding of EVB in relevant art, as shown in FIG. 1, the Extended VLAN Bridge (EVB) includes an EVB controlling bridge and a PE assembly connected with a physical port of the EVB controlling bridge. The EVB is connected with a User Equipment (UE) via the PE assembly and an external port of the EVB controlling bridge itself, and there are multiple extended ports inside the PE assembly. When the EVB controlling bridge detects a PE assembly at its physical port, depending on the number of UEs connected with the PE assembly, a port mapping S assembly corresponding to the EVB controlling bridge performs instantiation between a customer assembly (C assembly, in short) and the physical port, to allocate a service VLAN (S-VLAN) identifier (SVID) for a mapping port corresponding to an instance, that is, each physical port connected with the PE assembly will perform instantiation of a corresponding port on assembly C, such that a bridge originally with 3 physical ports is extended into a bridge with 7 exit port. Namely, there is a private virtual channel from the assembly C to each mapping port. After receiving a multicast frame, the assembly C will search for a corresponding mapping port according to a mapping relation between a multicast address and a mapping port bitmap, and forward the multicast frame at each mapping port.

However, because there is only one physical port between the EVB controlling bridge and each PE assembly, the virtualized mapping ports in the EVB controlling bridge actually correspond to the same physical port, such that in a multicast service, the same multicast frame is sent to the same physical port through multiple mapping ports, forwarded to the PE assembly by the physical port, and forwarded by the PE assembly again to each corresponding UE via a downlink port. Therefore, the same multicast frame may be repeatedly duplicated and forwarded at the same physical port, causing tremendous waste of network bandwidth resources.

SUMMARY

The main purpose of the present disclosure is to provide a method, a device, and a system for implementing multicast forwarding in an Extended VLAN Bridge (EVB) in order to avoid the waste of network bandwidth caused by repetitive forwarding of the same multicast frame by the same physical port during the implementation of the forwarding of a multicast service, so as to increase network bandwidth utilization.

The present disclosure provides a method for implementing multicast forwarding in an Extended VLAN Bridge (EVB), including:

a multicast frame is received and a multicast address is acquired from the multicast frame;

a master port and an identifier (ID) of a subgroup corresponding to the multicast address are inquired on from a first preset mapping table;

when the ID of the corresponding subgroup is a Multicast Identifier (MCID), the multicast frame carrying the MCID is forwarded to a corresponding Port Extender (PE) assembly via the master port; and the PE assembly distributes the multicast frame to a User Equipment (UE) according to a correspondence between the MCID carried in the multicast frame and a downlink port of the PE assembly.

In an embodiment, when the ID of the corresponding subgroup is a Multicast Identifier (MCID), forwarding the multicast frame carrying the MCID to a corresponding PE assembly via the master port may specifically include:

the MCID is carried in the multicast frame when the ID of the corresponding subgroup is the MCID; and the multicast frame carrying the MCID is forwarded via the master port to a physical port corresponding to the master port and sent via the physical port to the corresponding PE assembly.

In an embodiment, distributing, by the PE assembly, the multicast frame to a UE according to a correspondence between the MCID carried in the multicast frame and a downlink port of the PE assembly may specifically include:

the PE assembly receives the multicast frame carrying the MCID via an uplink port;

a second preset mapping table is inquired on, the multicast frame is duplicated and forwarded levelwise according to a correspondence between the MCID carried in the multicast frame and a PE downlink port in the second preset mapping table;

the MCID is stripped from the multicast frame when the multicast frame is forwarded to an external port between the PE assembly and the UE; and the multicast frame stripped of the MCID is sent to the UE via the external port.

In an embodiment, the method may further include: before a multicast frame is received and a multicast address is acquired from the multicast frame, the first preset mapping table is established for the mapping relation between the multicast address and the master port and the ID of the corresponding subgroup; and the second preset mapping table is established for the correspondence between the MCID and the PE downlink port.

In an embodiment, the method may further include: before a master port and an identifier (ID) of a subgroup corresponding to the multicast address are inquired on from a first preset mapping table, when the ID of the corresponding subgroup is a Customer VLAN Identifier (CVID), the multicast frame is sent to the UE via an external port corresponding to the CVID.

The present disclosure further provides a device for implementing multicast forwarding in an EVB, including a receiving module, an inquiring module, a forwarding module and a distributing module, wherein the receiving module is configured to receive a multicast frame, acquire a multicast address from the multicast frame, and send the multicast address to the inquiring module;

the inquiring module is configured to inquire on a master port and an identifier (ID) of a subgroup corresponding to the multicast address from a first preset mapping table and send an inquired result to the forwarding module;

the forwarding module is configured to forward, when the ID of the corresponding subgroup is a Multicast Identifier (MCID), the multicast frame carrying the MCID to a corresponding Port Extender (PE) assembly via the master port; and the distributing module is located in the PE assembly and is configured to distribute the multicast frame to a User Equipment (UE) according to a correspondence between the MCID carried in the multicast frame and a downlink port of the PE assembly.

In an embodiment, the forwarding module may include a carrying unit and a first sending unit, wherein the carrying unit is configured to carry the MCID in the multicast frame when the ID of the corresponding subgroup in the inquired result is the MCID; and the first sending unit is configured to forward via the master port the multicast frame carrying the MCID to a physical port corresponding to the master port and send via the physical port the multicast frame carrying the MCID to the corresponding PE assembly.

In an embodiment, the distributing module may include a receiving unit, an inquiring unit, a forwarding unit, a stripping unit and a second sending unit, wherein the receiving unit is configured to receive the multicast frame carrying the MCID via an uplink port;

the inquiring unit is configured to inquire on a second preset mapping table;

the forwarding unit is configured to duplicate and forward the multicast frame levelwise according to a correspondence between the MCID carried in the multicast frame and a PE downlink port in the second preset mapping table;

the stripping unit is configured to strip the MCID from the multicast frame when the multicast frame is forwarded to an external port between the PE assembly and the UE; and the second sending unit is configured to send the multicast frame stripped of the MCID to the UE via the external port.

In an embodiment, the device may further include:

an establishing module configured to establish the first preset mapping table for the mapping relation between the multicast address and the master port and the ID of the corresponding subgroup, send the first preset mapping table to the inquiring module, establish the second preset mapping table for the correspondence between the MCID and the PE downlink port, and send the second preset mapping table to the distributing module.

In an embodiment, the forwarding module may be further configured to send, when the ID of the corresponding subgroup is a Customer VLAN Identifier (CVID), the multicast frame to the UE via an external port corresponding to the CVID.

The present disclosure further provides a system for implementing multicast forwarding, including: an EVB and a UE connected with an external port of the EVB, wherein the EVB includes a device for implementing multicast forwarding, and the device for implementing multicast forwarding includes a receiving module, an inquiring module, a forwarding module, and a distributing module, wherein the receiving module is configured to receive a multicast frame, acquire a multicast address from the multicast frame, and send the multicast address to the inquiring module;

the inquiring module is configured to inquire on a master port and an identifier (ID) of a subgroup corresponding to the multicast address from a first preset mapping table and send an inquired result to the forwarding module;

the forwarding module is configured to forward, when the ID of the corresponding subgroup is a Multicast Identifier (MCID), the multicast frame carrying the MCID to a corresponding Port Extender (PE) assembly via the master port; and the distributing module is located in the PE assembly and is configured to distribute the multicast frame to the UE according to a correspondence between the MCID carried in the multicast frame and a downlink port of the PE assembly.

With the method, device, and system for implementing multicast forwarding in the EVB of the present disclosure, the same multicast frame is forwarded just once at the same physical port in the EVB according to the mapping relation between the multicast address in the multicast frame and the master port and the ID of the subgroup corresponding to the multicast address, avoiding waste of network bandwidth caused by repetitive duplicating of the multicast frame by the same physical port, and increasing network bandwidth utilization.

DETAILED DESCRIPTION

The technical solution of the disclosure is further elaborated with reference to the figures and embodiments.

The basic idea of the disclosure is that: in an EVB, a subgroup of each multicast group at an extended physical port is identified by an identifier (ID), the multicast frame is forwarded at an external port of an EVB controlling bridge itself identified by a Customer VLAN ID (CVID) when the ID of a subgroup corresponding to the multicast address is the CVID; and when the ID of the subgroup corresponding to the multicast address is a Multicast ID (MCID), the multicast frame is forwarded at the master port identified by the MCID and sent to a corresponding PE assembly via a corresponding physical port, avoiding repetitive duplicating and forwarding of the multicast frame at the same physical port of the extended bridge, and increasing network bandwidth utilization.

Figure 1:
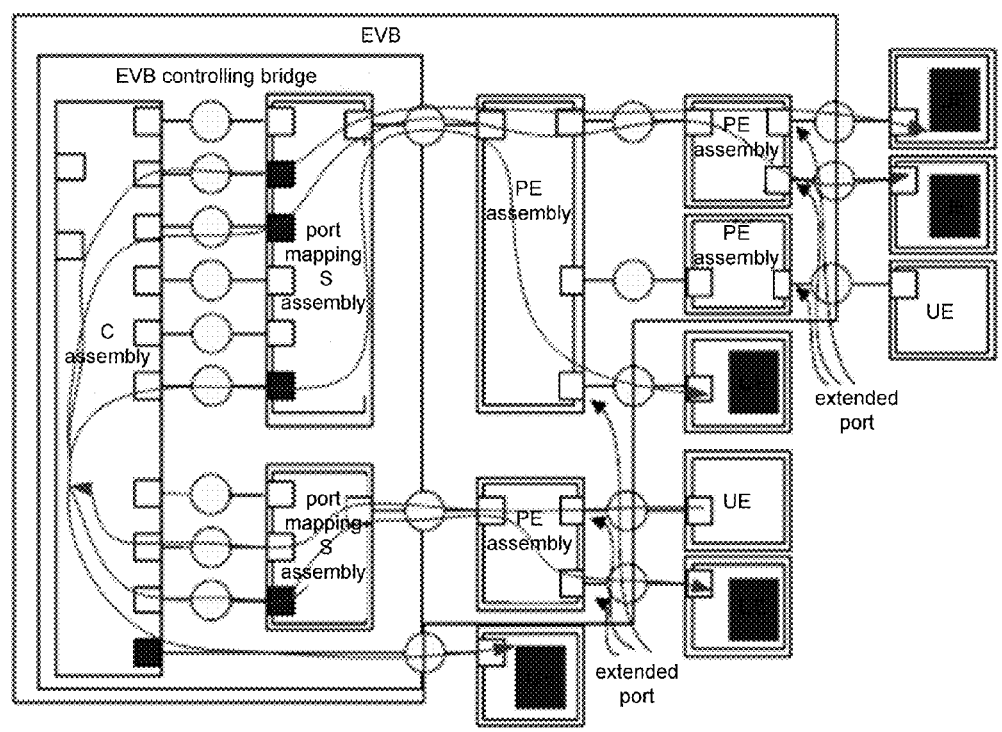
FIG. 1 is a flowchart of multicast forwarding of EVB in relevant art.
Figure 2:
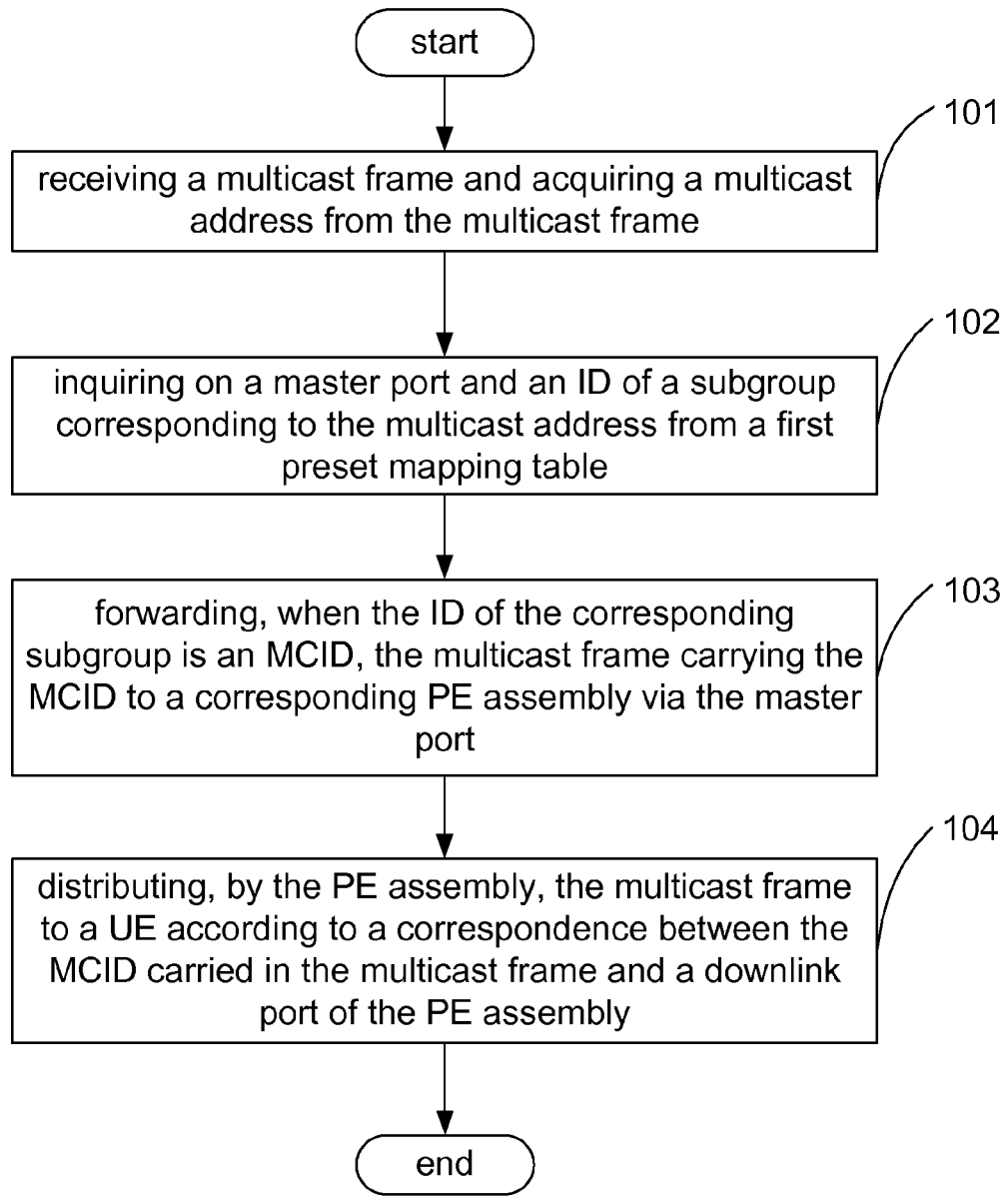
FIG. 2 is a flowchart of a method for implementing multicast forwarding in an EVB according to an embodiment of the present disclosure.

FIG. 2 is a flowchart of a method for implementing multicast forwarding in an EVB according to an embodiment of the present disclosure. As shown in FIG. 2, the method for implementing multicast forwarding in an EVB proposed by an embodiment of the disclosure includes the following steps.

Step 101: receiving a multicast frame and acquiring a multicast address from the multicast frame.

The operating environment of the method of the disclosure is the aforementioned EVB connected with a UE, wherein the EVB includes an EVB controlling bridge and a PE assembly, and one EVB controlling bridge forms one multicast group together with multiple PE assemblies. The EVB controlling bridge is connected with a PE assembly via a physical port. The EVB receives a multicast frame via the EVB controlling bridge. The PE assembly may extend the physical port into multiple downlink ports, and the PE assembly distributes the multicast frame to a UE via a corresponding PE downlink port. In this step, when receiving the multicast frame, the EVB controlling bridge acquires the multicast address from the multicast frame, wherein one multicast frame includes one multicast address, each multicast address corresponds to multiple subgroups of one multicast group, each subgroup corresponds to one extended physical port, and each subgroup corresponds to a master port in the mapping ports of the port mapping S assembly of one EVB controlling bridge.

Step 102: inquiring on a master port and an identifier (ID) of a subgroup corresponding to the multicast address from a first preset mapping table.

In this embodiment, a first preset mapping table representing a correspondence between the multicast address and the ID of a subgroup corresponding to the multicast address is added in the C assembly of the EVB controlling bridge, namely, the subgroup of each multicast group at the extended physical port is identified by the ID. If the EVB controlling bridge forwards the multicast frame through extension of the physical port by the PE assembly, the first preset mapping table includes the correspondence between the multicast address and the MCID of the subgroup in which the physical port is located, wherein the composition of the MCID includes all members joining the corresponding multicast group under the physical port, each MCID corresponds to the master port of a mapping port. If the multicast group includes an external port provided by the EVB controlling bridge itself (namely, the external port is directly connected to the UE instead of being extended via the PE assembly), then the first mapping table further includes a correspondence between the multicast address and the CVID corresponding to the external port. The first mapping table, after being established, is stored in a Forwarding Database (FDB). When the C assembly of the EVB controlling bridge receives a multicast frame, the first preset mapping table is inquired on in the FDB using the multicast address carried in the multicast frame as an index, to acquire the CVID or MCID corresponding to the multicast address as well as the corresponding master port or external port.

The specific corresponding entries in aforesaid first mapping table are shown as in the following Table 1:

TABLE 1

| Multicast address | Subgroup ID | Corresponding exit |
|---|---|---|
| A | MCID1 | Port1 (master port) |
| | MCID2 | Port1 (master port) |
| | MCID3 | Port2 (master port) |
| | ... | ... |
| | CVID (VID carried by the multicast frame) | Port3 (external port) Port4 (external port) |
| B | MCID1 | Port1 (master port) |
| | MCID8 | Port2 (master port) |
| | MCID9 | Port5 (master port) |
| | ... | ... |

As shown in Table 1, one multicast address A corresponds to multiple subgroups identified by different MCIDs. Within one multicast frame, one MCID corresponds to one subgroup, and the subgroup of each MCID corresponds to one master port, each subgroup also corresponds to one physical port.

Step 103: forwarding, when the ID of the corresponding subgroup is a Multicast Identifier (MCID), the multicast frame carrying the MCID to a corresponding PE assembly via the master port.

Specifically, as mentioned above, by inquiring on the first preset mapping table, when the ID of the subgroup corresponding to the multicast address is an MCID, the MCID is carried in the multicast frame as part of the multicast frame TAG header, and the multicast frame carrying the MCID is forwarded via the corresponding master port and sent to the corresponding PE assembly via the corresponding physical port, wherein the sending at the corresponding physical port is done just once.

Step 104: distributing, by the PE assembly, the multicast frame to a UE according to a correspondence between the MCID carried in the multicast frame and a downlink port of the PE assembly.

In this embodiment, a second preset mapping table representing a correspondence between an MCID and a downlink port of the PE assembly may be set beforehand.

When the PE assembly receives the multicast frame forwarded from the master port, the multicast frame is distributed to a UE according to the correspondence between the MCID and the downlink port of the PE assembly in the second preset mapping table.

Figure 3:
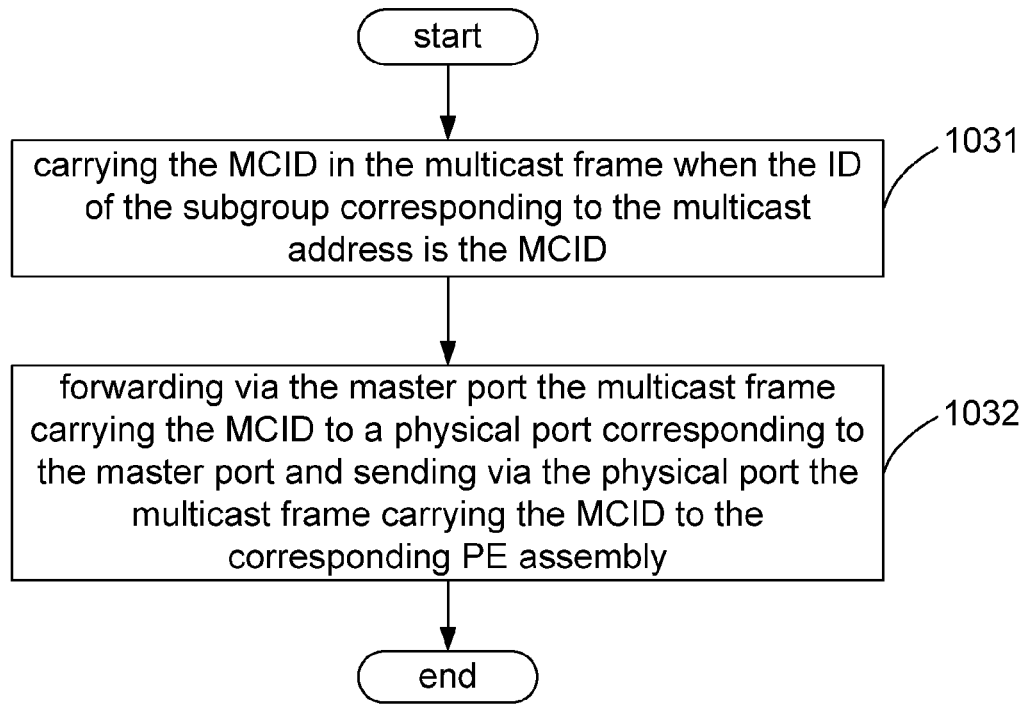
FIG. 3 is the specific flowchart of Step 103 in the method for implementing multicast forwarding in an EVB shown in FIG. 2.

FIG. 3 is the specific flowchart of Step 103 in the method for implementing multicast forwarding in an EVB shown in FIG. 2, and as shown in FIG. 3, the Step 103 specifically includes:

Step 1031: carrying the MCID in the multicast frame when the ID of the subgroup corresponding to the multicast address is the MCID; and Step 1032: forwarding via the master port the multicast frame carrying the MCID to a physical port corresponding to the master port and sending via the physical port the multicast frame carrying the MCID to the corresponding PE assembly.

Figure 4:
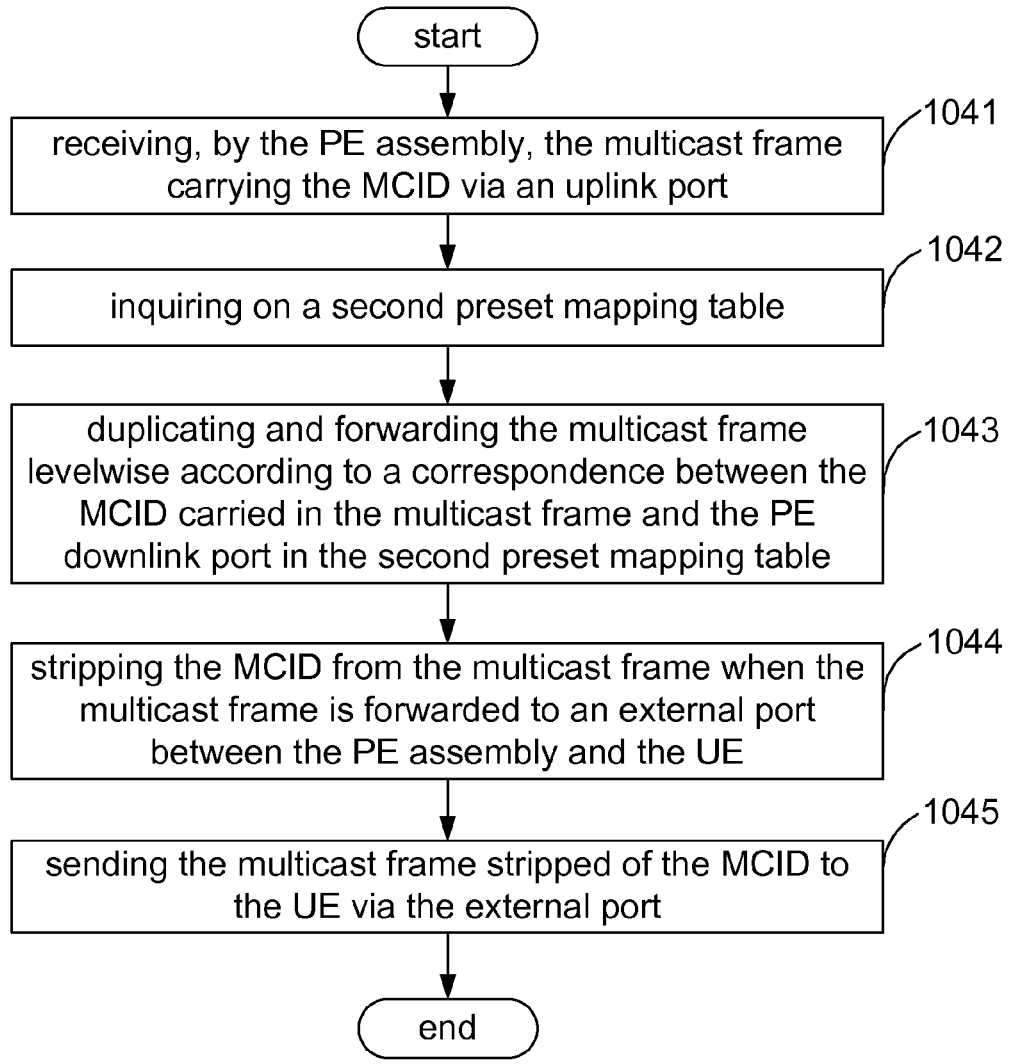
FIG. 4 is the specific flowchart of Step 104 in the method for implementing multicast forwarding in an EVB shown in FIG. 2.

FIG. 4 is the specific flowchart of Step 104 in the method for implementing multicast forwarding in an EVB shown in FIG. 2, and as shown in FIG. 4, the Step 104 specifically includes:

Step 1041: receiving, by the PE assembly, the multicast frame carrying the MCID via an uplink port;

Step 1042: inquiring on a second preset mapping table;

Step 1043: duplicating and forwarding the multicast frame levelwise according to a correspondence between the MCID carried in the multicast frame and the PE downlink port in the second preset mapping table;

Step 1044: stripping the MCID from the multicast frame when the multicast frame is forwarded to an external port between the PE assembly and the UE; and Step 1045: sending the multicast frame stripped of the MCID to the UE via the external port.

In the steps 1041 to 1045, when the PE assembly receives the multicast frame carrying the MCID sent by the EVB controlling bridge, the multicast frame is duplicated and forwarded respectively at a corresponding downlink port according to the second preset mapping table. Because the PE downlink port is a level-wise extension for the corresponding physical port, the PE assembly forwards the multicast frame to the UE through a downlink port extended level by level according to the correspondence between the MCID and the PE downlink port in the second preset mapping table. Before the multicast frame reaches the UE, if the downlink port is an external port of the EVB (i.e., an external port between the PE assembly and the UE), then the PE assembly strips the MCID from the multicast frame before forwarding, such that the multicast frame obtained by the UE is the original multicast frame.

Figure 5:
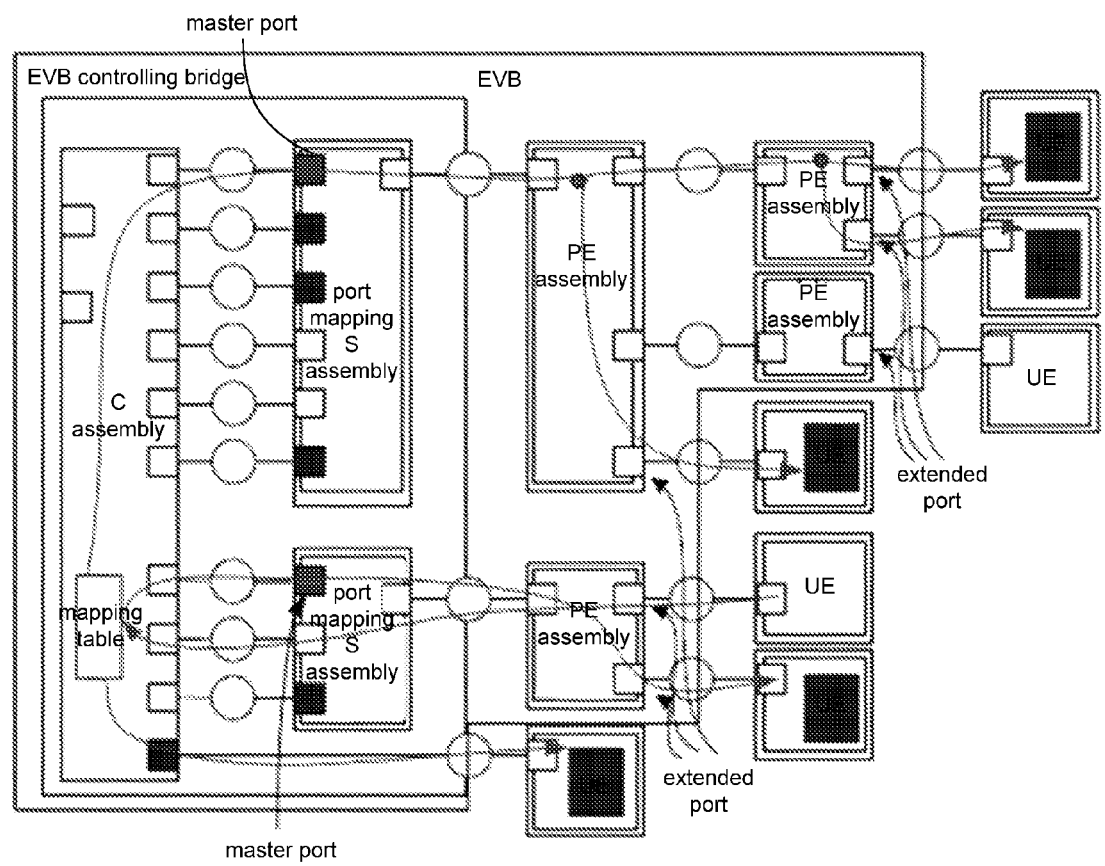
FIG. 5 is a schematic view of an exemplary application of the aforesaid method embodiment.

FIG. 5 is a schematic view of an exemplary application of the aforesaid method embodiment. As shown in FIG. 5, the 5 UEs marked black in the figure are in the same multicast group, and except for that the UE at the bottom has a corresponding physical port, the other 4 UEs all corresponds to respective virtual ports inside the EVB controlling bridge. For example, for the topmost physical port of the EVB itself in the figure, the multicast frame will be sent repeatedly for three times at the topmost physical port if a conventional way of processing is adopted, while the multicast frame is sent just once using the method embodiment herein. This is specifically implemented as follows.

By inquiring on a mapping table, the C assembly acquires the master port of a port mapping S assembly inside the EVB controlling bridge corresponding to the multicast address and the MCID of a multicast subgroup inside the assembly, and then forwards just once the multicast frame carrying the MCID at the corresponding master port, and the distribution of the multicast frame is realized by the PE assembly. In actual networking, there may be hundreds or thousands of members (or even more) in a multicast group, and with the method embodiment herein, the problem of network storms and influence on the network performance caused by repetitive duplicating and forwarding of the multicast frame at the same physical port in the EVB may be solved effectively, reducing waste of bandwidth resources and increasing utilization of network resources.

Figure 6:
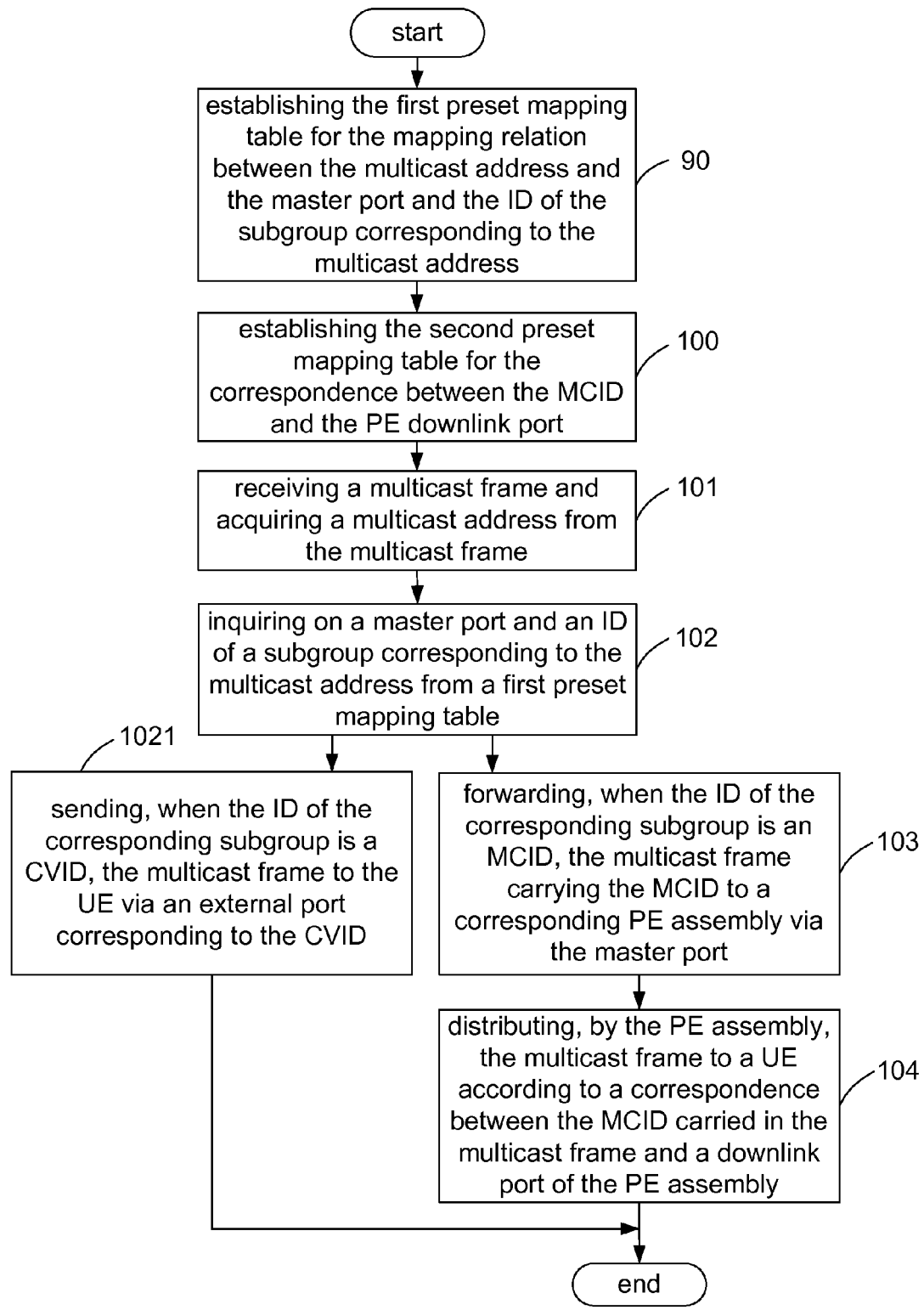
FIG. 6 is a flowchart of a method for implementing multicast forwarding in an EVB according to another embodiment of the present disclosure.

FIG. 6 is a flowchart of a method for implementing multicast forwarding in an EVB according to another embodiment of the present disclosure. As shown in FIG. 6, another embodiment of the disclosure proposes a method for implementing multicast forwarding in an EVB. Based on the aforementioned embodiment, before the Step 101, the method further includes:

Step 90: establishing the first preset mapping table for the mapping relation between the multicast address and the master port and the ID of the subgroup corresponding to the multicast address; and Step 100: establishing the second preset mapping table for the correspondence between the MCID and the PE downlink port.

After the Step 102, the method further includes:

Step 1021: sending, when the ID of the corresponding subgroup is a CVID, the multicast frame to the UE via an external port corresponding to the CVID.

As shown in the Table 1, when the ID of the subgroup corresponding to the multicast address is CVID, it means that the subgroup identified by the CVID corresponds to an external port provided by the EVB controlling bridge, namely, the external port is not extended through a PE assembly, so the EVB controlling bridge forwards the multicast frame at one or more external ports of the EVB controlling bridge itself identified by the CVID according to a regular multicast forwarding process.

When the ID of the subgroup corresponding to the multicast address is MCID, the EVB controlling bridge will forward the multicast frame to a corresponding PE assembly only at the only one master port (which is the control channel between the EVB controlling bridge and the PE assembly) of the subgroup identified by the MCID.

Figure 7:
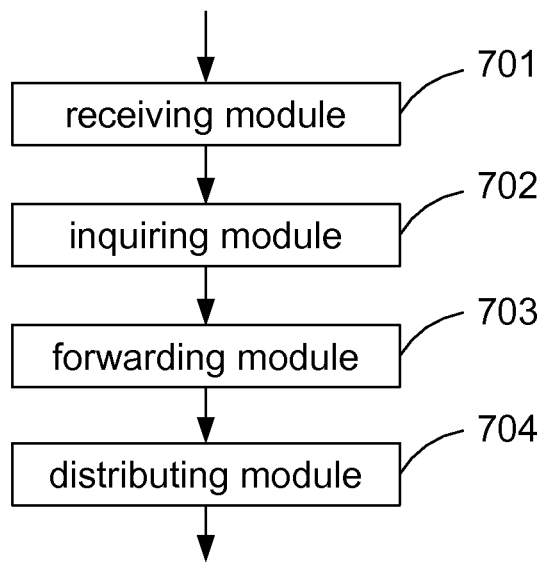
FIG. 7 is a structural diagram of a device for implementing multicast forwarding in an EVB according to an embodiment of the present disclosure.

FIG. 7 is a structural diagram of a device for implementing multicast forwarding in an EVB according to an embodiment of the present disclosure. As shown in FIG. 7, the device for implementing multicast forwarding in an EVB of the disclosure includes a receiving module 701, an inquiring module 702, a forwarding module 703 and a distributing module 704, wherein the receiving module 701 is configured to receive a multicast frame, acquire a multicast address from the multicast frame, and send the multicast address to the inquiring module 702;

the inquiring module 702 is configured to inquire on a master port and an identifier (ID) of a subgroup corresponding to the multicast address from a first preset mapping table and send an inquired result to the forwarding module 703;

the forwarding module 703 is configured to forward, when the ID of the corresponding subgroup in the inquired result is an MCID, the multicast frame carrying the MCID to a corresponding PE assembly via the master port; and the distributing module 704 is located in the PE assembly and is configured to distribute the multicast frame to a UE according to a correspondence between the MCID carried in the multicast frame and a downlink port of the PE assembly.

Figure 8:
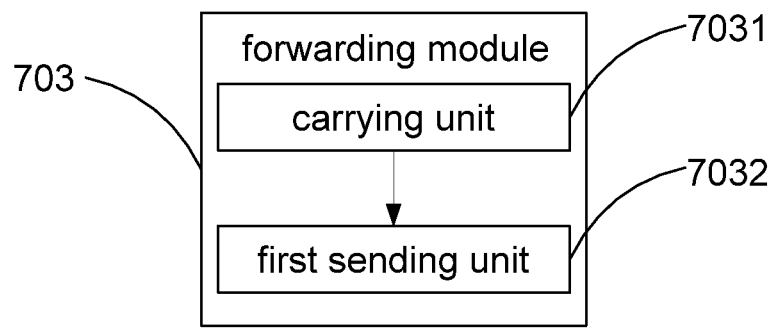
FIG. 8 is a detailed structural diagram of a forwarding module in the device for implementing multicast forwarding in an EVB shown in FIG. 7.

FIG. 8 is a detailed structural diagram of a forwarding module in the device for implementing multicast forwarding in an EVB shown in FIG. 7. As shown in FIG. 8, the forwarding module 703 includes:

a carrying unit 7031 configured to carry the MCID in the multicast frame when the ID of the corresponding subgroup is the MCID; and a first sending unit 7032 configured to forward via the master port the multicast frame carrying the MCID to a physical port corresponding to the master port and send via the physical port the multicast frame carrying the MCID to the corresponding PE assembly.

Figure 9:
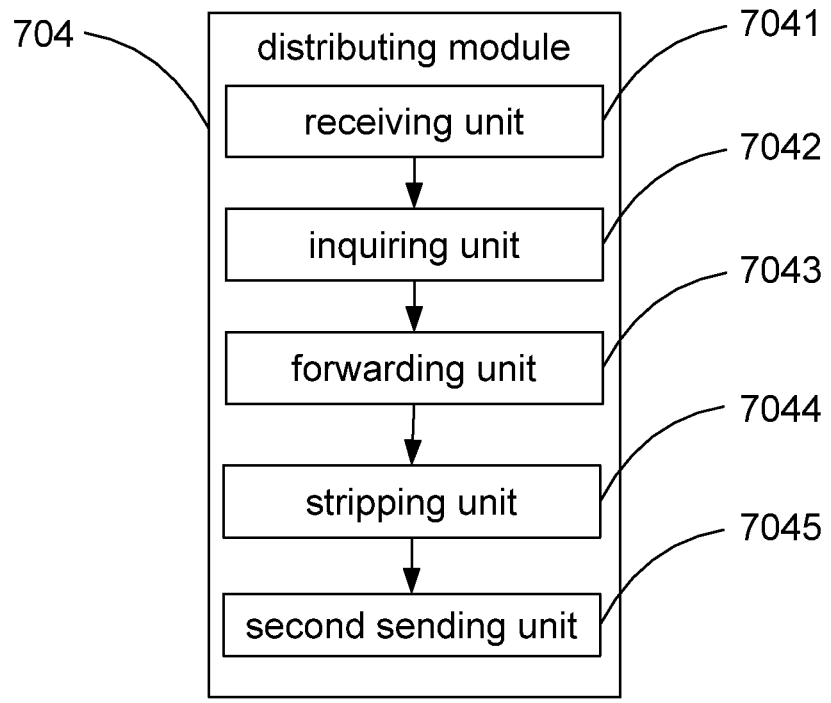
FIG. 9 is a detailed structural diagram of a distributing module in the device for implementing multicast forwarding in an EVB shown in FIG. 7.

FIG. 9 is a detailed structural diagram of a distributing module in the device for implementing multicast forwarding in an EVB shown in FIG. 7. As shown in FIG. 9, the distributing module 704 includes:

a receiving unit 7041 configured to receive the multicast frame carrying the MCID via an uplink port;

an inquiring unit 7042 configured to inquire on a second preset mapping table;

a forwarding unit 7043 configured to duplicate and forward the multicast frame levelwise according to a correspondence between the MCID carried in the multicast frame and a PE downlink port in the second preset mapping table;

a stripping unit 7044 configured to strip the MCID from the multicast frame when the multicast frame is forwarded to an external port between the PE assembly and the UE; and a second sending unit 7045 configured to send the multicast frame stripped of the MCID to the UE via the external port.

The device in this embodiment may be provided inside the EVB, and the receiving module 701 receives the multicast frame and acquires the multicast address from the multicast frame. In this embodiment, the receiving module 701 may be an EVB controlling bridge. One multicast frame includes one multicast address. The EVB includes a number of multicast groups. One multicast address corresponds to multiple subgroups of one multicast group, each subgroup corresponds to one extended physical port, and each subgroup corresponds to a master port in the mapping ports of the port mapping S assembly of one EVB controlling bridge. When the multicast frame is received, the inquiring module 702 inquires on the master port and ID of the corresponding subgroup from the first preset mapping table using the multicast address as the index, and when the ID of the corresponding subgroup is MCID, the forwarding module 703 forwards the multicast frame carrying the MCID to the corresponding PE assembly via the corresponding master port; the distributing module 704 in the PE assembly distributes the multicast frame to the UE according to the correspondence between the MCID carried in the multicast frame and the PE downlink port. The specific process of forwarding and distributing includes:

when the ID of the corresponding subgroup is the MCID, the carrying unit 7031 in the forwarding module 703 carries the MCID in the multicast frame, the first sending unit 7032 forwards via the corresponding master port the multicast frame carrying the MCID to the physical port corresponding to the master port, and sends the multicast frame carrying the MCID to the corresponding PE assembly via the physical port.

The receiving unit 7041 in the distributing module 704 receives the multicast frame carrying the MCID via a PE uplink port, the inquiring unit 7042 inquires on the second preset mapping table, and the forwarding unit 7043 duplicates and forwards the multicast frame levelwise according to a correspondence between the MCID carried in the multicast frame and a PE downlink port in the second preset mapping table; the stripping unit 7044 strips the MCID from the multicast frame when the multicast frame is forwarded to an external port between the PE assembly and the UE; and finally the second sending unit sends the multicast frame stripped of the MCID to the UE via the external port, such that the multicast information obtained by the UE is the required information.

The first preset mapping table reflects the mapping relation between the multicast address and the master port and ID of a subgroup corresponding to the multicast address; the second preset mapping table reflects the correspondence between the MCID and a PE downlink port.

In an embodiment of the present disclosure, the same multicast frame is forwarded just once at the same physical port in the EVB according to the mapping relation between the multicast address in the multicast frame and the master port and the ID of the corresponding subgroup, avoiding waste of network bandwidth caused by repetitive duplicating of the multicast frame by the same physical port, and increasing network bandwidth utilization.

Figure 10:
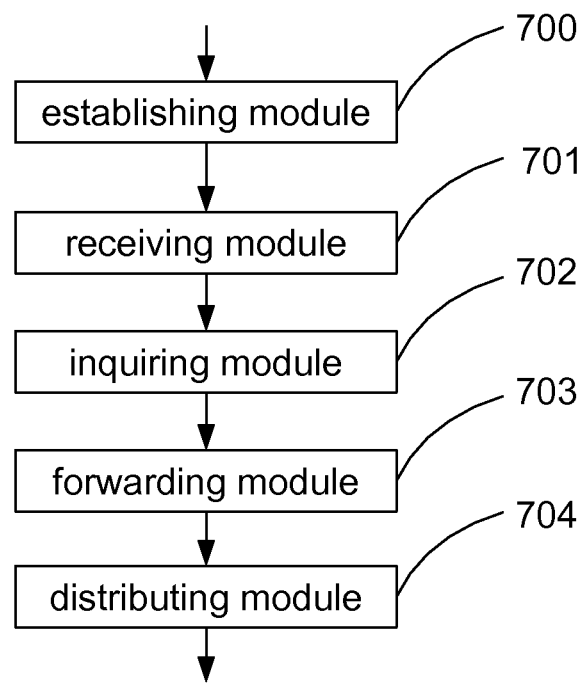
FIG. 10 is an structural diagram of a device for implementing multicast forwarding in an EVB according to another embodiment of the present disclosure.

FIG. 10 is an structural diagram of a device for implementing multicast forwarding in an EVB according to another embodiment of the present disclosure. As shown in FIG. 10, another embodiment of the disclosure proposes a device for implementing multicast forwarding in EVB, wherein based on the previous embodiment, the device further includes:

an establishing module 700 connected with the receiving module 701 and configured to establish the first preset mapping table for the mapping relation between the multicast address and the master port and the ID of the corresponding subgroup, send the first preset mapping table to the inquiring module, establish the second preset mapping table for the correspondence between the MCID and the PE downlink port, and send the second preset mapping table to the distributing module.

The forwarding module 703 may be further configured to, when the ID of the corresponding subgroup is a CVID, the multicast frame to the UE via an external port corresponding to the CVID; in this embodiment, the multicast frame is sent to the UE via the external port of the EVB controlling bridge itself.

Figure 11:
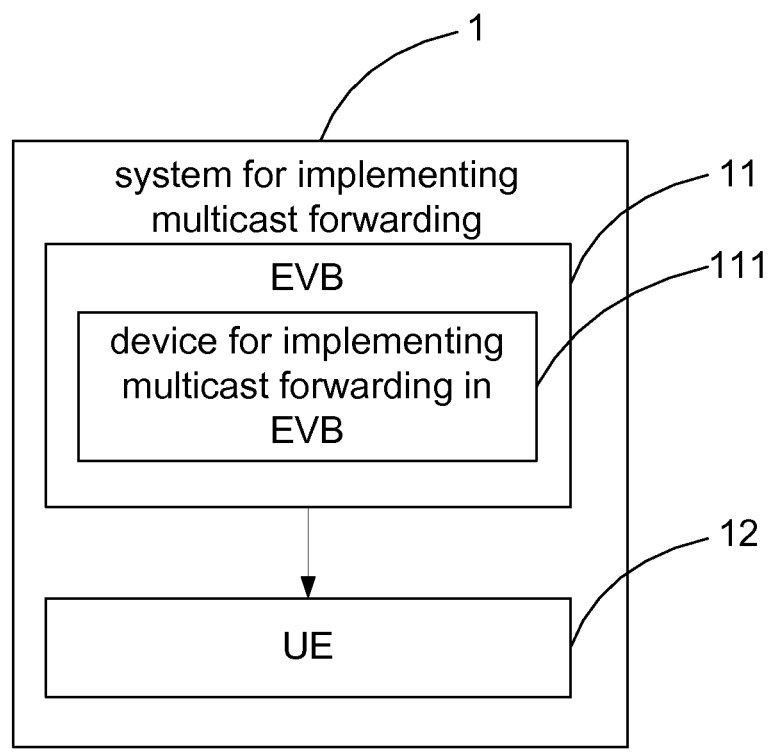
FIG. 11 is a structural diagram of a system for implementing multicast forwarding according to an embodiment of the present disclosure.

FIG. 11 a the structural diagram of a system for implementing multicast forwarding according to an embodiment of the present disclosure. As shown in FIG. 11, the disclosure proposes a system for implementing multicast forwarding 1, including an EVB 11 and a UE 12 connected with an external port of the EVB 11, wherein the EVB 11 includes a device for implementing multicast forwarding 111 described in an aforementioned embodiment, and the device for implementing multicast forwarding 111 includes a receiving module 701, an inquiring module 702, a forwarding module 703, and a distributing module 704, wherein the receiving module 701 is configured to receive a multicast frame, acquire a multicast address from the multicast frame, and send the multicast address to the inquiring module;

the inquiring module 702 is configured to inquire on a master port and an identifier (ID) of a subgroup corresponding to the multicast address from a first preset mapping table and send an inquired result to the forwarding module 703;

the forwarding module 703 is configured to forward, when the ID of the corresponding subgroup in the inquired result is an MCID, the multicast frame carrying the MCID to a corresponding PE assembly via the master port; and the distributing module 704 is located in the PE assembly and is configured to distribute the multicast frame to a UE according to a correspondence between the MCID carried in the multicast frame and a downlink port of the PE assembly.

With the method, device, and system for implementing multicast forwarding in the EVB of the present disclosure, the same multicast frame is forwarded just once at the same physical port in the EVB according to the mapping relation between the multicast address in the multicast frame and the master port and the ID of the subgroup corresponding to the multicast address, avoiding waste of network bandwidth caused by repetitive duplicating of the multicast frame by the same physical port, and increasing network bandwidth utilization.

What described above are merely preferable embodiments of the present disclosure and are not intended to limit the scope of the disclosure, and any equivalent structure or flow variation made using the content of the description and figures of the disclosure or direct or indirect application to any other relevant technical field is likewise included in the scope of the present disclosure.

The invention claimed is:

1. A method for implementing multicast forwarding in an Extended VLAN Bridge (EVB), comprising:
receiving a multicast frame and acquiring a multicast address from the multicast frame;

inquiring two or more subgroups corresponding to the multicast address from a first preset mapping table;

inquiring an identifier (ID) corresponding to each subgroup, mapping port corresponding to each ID of the corresponding subgroup and a master port of the inquired mapping ports from the first preset mapping table;

forwarding, when the ID of the corresponding subgroup is a Multicast Identifier (MCID), the multicast frame carrying the MCID to a corresponding Port Extender (PE) assembly via the master port; and distributing, by the PE assembly, the multicast frame to a User Equipment (UE) according to a correspondence between the MCID carried in the multicast frame and a downlink port of the PE assembly, wherein distributing, by the PE assembly, the multicast frame to a UE according to a correspondence between the MCID carried in the multicast frame and a downlink port of the PE assembly comprises:

receiving, by the PE assembly, the multicast frame carrying the MCID via an uplink port;

inquiring on a second preset mapping table, duplicating and forwarding the multicast frame through a downlink port which extended level by level according to a correspondence between the MCID carried in the multicast frame and a PE downlink port in the second preset mapping table;

stripping the MCID from the multicast frame when the multicast frame is forwarded to an external port between the PE assembly and the UE; and sending the multicast frame stripped of the MCID to the UE via the external port.

2. The method according to claim 1, wherein forwarding, when the ID of the corresponding subgroup is an MCID, the multicast frame carrying the MCID to a corresponding PE assembly via the master port comprises:

carrying the MCID in the multicast frame when the ID of the corresponding subgroup is the MCID; and forwarding via the master port the multicast frame carrying the MCID to a physical port corresponding to the master port and sending via the physical port the multicast frame carrying the MCID to the corresponding PE assembly.

3. The method according to claim 1, further comprising: before receiving a multicast frame and acquiring a multicast address from the multicast frame, establishing the first preset mapping table for the mapping relation between the multicast address and the master port and the ID of the corresponding subgroup; and establishing the second preset mapping table for the correspondence between the MCID and the PE downlink port.

4. The method according to claim 3, further comprising: before inquiring on a master port and an ID of a subgroup corresponding to the multicast address from a first preset mapping table, sending, when the ID of the corresponding subgroup is a Customer VLAN Identifier (CVID), the multicast frame to the UE via an external port corresponding to the CVID.

5. The method according to claim 2, wherein distributing, by the PE assembly, the multicast frame to a UE according to a correspondence between the MCID carried in the multicast frame and a downlink port of the PE assembly comprises:

receiving, by the PE assembly, the multicast frame carrying the MCID via an uplink port;

inquiring on a second preset mapping table, duplicating and forwarding the multicast frame through a downlink port which extend level by level according to a correspondence between the MCID carried in the multicast frame and a PE downlink port in the second preset mapping table;

stripping the MCID from the multicast frame when the multicast frame is forwarded to an external port between the PE assembly and the UE; and sending the multicast frame stripped of the MCID to the UE via the external port.

6. The method according to claim 5, further comprising: before receiving a multicast frame and acquiring a multicast address from the multicast frame, establishing the first preset mapping table for the mapping relation between the multicast address and the master port and the ID of the corresponding subgroup; and establishing the second preset mapping table for the correspondence between the MCID and the PE downlink port.

7. The method according to claim 6, further comprising: before inquiring on a master port and an ID of a subgroup corresponding to the multicast address from a first preset mapping table, sending, when the ID of the corresponding subgroup is a Customer VLAN Identifier (CVID), the multicast frame to the UE via an external port corresponding to the CVID.

8. A device for implementing multicast forwarding in an Extended VLAN Bridge (EVB), comprising a receiving module, an inquiring module, a forwarding module and a distributing module, wherein the receiving module is configured to receive a multicast frame, acquire a multicast address from the multicast frame, and send the multicast address to the inquiring module;

the inquiring module is configured to inquire on two or more subgroups corresponding to the multicast address, an identifier (ID) corresponding to each subgroup, mapping port corresponding to each ID of the corresponding subgroup and a master port of the inquired mapping ports from a first preset mapping table and send an inquired result to the forwarding module;

the forwarding module is configured to forward, when the ID of the corresponding subgroup is a Multicast Identifier (MCID), the multicast frame carrying the MCID to a corresponding Port Extender (PE) assembly via the master port; and the distributing module is located in the PE assembly and is configured to distribute the multicast frame to a User Equipment (UE) according to a correspondence between the MCID carried in the multicast frame and a downlink port of the PE assembly, wherein the receiving module, inquiring module, forwarding module and distributing module are each the result of execution on a processor of instructions stored in a memory, wherein the distributing module comprises a receiving unit, an inquiring unit, a forwarding unit, a stripping unit and a second sending unit, wherein the receiving unit is configured to receive the multicast frame carrying the MCID via an uplink port;

the inquiring unit is configured to inquire on a second preset mapping table;

the forwarding unit is configured to duplicate and forward the multicast frame through a downlink port which extended level by level according to a correspondence between the MCID carried in the multicast frame and a PE downlink port in the second preset mapping table;

the stripping unit is configured to strip the MCID from the multicast frame when the multicast frame is forwarded to an external port between the PE assembly and the UE; and the second sending unit is configured to send the multicast frame stripped of the MCID to the UE via the external port, wherein the receiving unit, inquiring unit, forwarding unit, stripping unit and second sending unit are each the result of execution on a processor of instructions stored in a memory.

9. The device according to claim 8, wherein the forwarding module comprises a carrying unit and a first sending unit, wherein the carrying unit is configured to carry the MCID in the multicast frame when the ID of the corresponding subgroup in the inquired result is the MCID; and the first sending unit is configured to forward via the master port the multicast frame carrying the MCID to a physical port corresponding to the master port and send via the physical port the multicast frame carrying the MCID to the corresponding PE assembly, wherein the carrying unit and first sending unit are each the result of execution on a processor of instructions stored in a memory.

10. The device according to claim 6, further comprising:
an establishing module configured to establish the first preset mapping table for the mapping relation between the multicast address and the master port and the ID of the corresponding subgroup, send the first preset mapping table to the inquiring module, establish the second preset mapping table for the correspondence between the MCID and the PE downlink port, and send the second preset mapping table to the distributing module, wherein the establishing module is the result of execution on a processor of instructions stored in a memory.

11. The device according to claim 10, wherein the forwarding module is further configured to send, when the ID of the corresponding subgroup is a Customer VLAN Identifier (CVID), the multicast frame to the UE via an external port corresponding to the CVID.

12. The device according to claim 9, wherein the distributing module comprises a receiving unit, an inquiring unit, a forwarding unit, a stripping unit and a second sending unit, wherein the receiving unit is configured to receive the multicast frame carrying the MCID via an uplink port;

the inquiring unit is configured to inquire on a second preset mapping table;

the forwarding unit is configured to duplicate and forward the multicast frame through a downlink port which extended level by level according to a correspondence between the MCID carried in the multicast frame and a PE downlink port in the second preset mapping table;

the stripping unit is configured to strip the MCID from the multicast frame when the multicast frame is forwarded to an external port between the PE assembly and the UE; and the second sending unit is configured to send the multicast frame stripped of the MCID to the UE via the external port, wherein the receiving unit, inquiring unit, forwarding unit, stripping unit and second sending unit are each the result of execution on a processor of instructions stored in a memory.

13. The device according to claim 12, further comprising:
an establishing module configured to establish the first preset mapping table for the mapping relation between the multicast address and the master port and the ID of the corresponding subgroup, send the first preset mapping table to the inquiring module, establish the second preset mapping table for the correspondence between the MCID and the PE downlink port, and send the second preset mapping table to the distributing module, wherein the establishing module is the result of execution on a processor of instructions stored in a memory.

14. The device according to claim 13, wherein the forwarding module is further configured to send, when the ID of the corresponding subgroup is a Customer VLAN Identifier (CVID), the multicast frame to the UE via an external port corresponding to the CVID.

15. A system for implementing multicast forwarding, comprising: an Extended VLAN Bridge (EVB) and a User Equipment (UE) connected with an external port of the EVB, wherein the EVB comprises a device for implementing multicast forwarding, and the device for implementing multicast forwarding comprises a receiving module, an inquiring module, a forwarding module, and a distributing module, wherein the receiving module is configured to receive a multicast frame, acquire a multicast address from the multicast frame, and send the multicast address to the inquiring module;

the inquiring module is configured to inquire on two or more subgroups corresponding to the multicast address, an identifier (ID) corresponding to each subgroup, mapping port corresponding to each ID of the corresponding subgroup and a master port of the inquired mapping ports from a first preset mapping table and send an inquired result to the forwarding module;

the forwarding module is configured to forward, when the ID of the corresponding subgroup is a Multicast Identifier (MCID), the multicast frame carrying the MCID to a corresponding Port Extender (PE) assembly via the master port; and the distributing module is located in the PE assembly and is configured to distribute the multicast frame to the UE according to a correspondence between the MCID carried in the multicast frame and a downlink port of the PE assembly, wherein the receiving module, inquiring module, forwarding module and distributing module are each the result of execution on a processor of instructions stored in a memory, wherein the distributing module comprises a receiving unit, an inquiring unit, a forwarding unit, a stripping unit and a second sending unit, wherein the receiving unit is configured to receive the multicast frame carrying the MCID via an uplink port;

the inquiring unit is configured to inquire on a second preset mapping table;

the forwarding unit is configured to duplicate and forward the multicast frame through a downlink port which extended level by level according to a correspondence between the MCID carried in the multicast frame and a PE downlink port in the second preset mapping table;

the stripping unit is configured to strip the MCID from the multicast frame when the multicast frame is forwarded to an external port between the PE assembly and the UE; and the second sending unit is configured to send the multicast frame stripped of the MCID to the UE via the external port, wherein the receiving unit, inquiring unit, forwarding unit, stripping unit and second sending unit are each the result of execution on a processor of instructions stored in a memory.

* * * * *